United States Patent
Monsen et al.

(10) Patent No.: US 6,625,152 B1
(45) Date of Patent: Sep. 23, 2003

(54) METHODS AND APPARATUS FOR TRANSFERRING DATA USING A FILTER INDEX

(75) Inventors: Robert Monsen, Castro Valley, CA (US); Steven Berl, Piedmont, CA (US); John G. Waclawsky, Fredrick, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/416,781

(22) Filed: Oct. 13, 1999

(51) Int. Cl.[7] .............................................. H04L 12/56
(52) U.S. Cl. ..................... 370/392; 370/218; 370/242; 709/203
(58) Field of Search ................................ 370/218, 242, 370/245, 395.52, 401, 902, 240, 497, 392; 709/200, 201, 203, 208, 209

(56) References Cited

U.S. PATENT DOCUMENTS

| | | | |
|---|---|---|---|
| 5,351,243 A | * 9/1994 | Kalkunte et al. ............ 370/475 |
| 5,602,729 A | * 2/1997 | Krueger et al. ............. 717/124 |
| 5,790,554 A | * 8/1998 | Pitcher et al. ............... 370/471 |
| 5,805,808 A | 9/1998 | Hasani et al. ................ 709/243 |
| 5,917,821 A | * 6/1999 | Gobuyan et al. ............ 370/392 |
| 5,935,210 A | * 8/1999 | Stark ........................... 709/224 |
| 6,006,259 A | 12/1999 | Adelman et al. ............ 709/223 |
| 6,011,780 A | * 1/2000 | Vaman et al. ................ 370/237 |
| 6,038,601 A | 3/2000 | Lambert et al. ............. 709/226 |
| 6,078,957 A | 6/2000 | Adelman et al. ............ 709/224 |
| 6,147,976 A | * 11/2000 | Shand et al. ................. 370/254 |
| 6,178,419 B1 | 1/2001 | Legh-Smith et al. |
| 6,212,184 B1 | * 4/2001 | Venkatachary et al. ..... 370/392 |
| 6,415,329 B1 | * 7/2002 | Gelman et al. .............. 709/245 |

* cited by examiner

*Primary Examiner*—Hassan Kizou
*Assistant Examiner*—Andrew M. Waxman
(74) *Attorney, Agent, or Firm*—Chapin & Huang, L.L.C.; David E. Huang, Esq.

(57) ABSTRACT

A server installation, which includes multiple servers, services a client request using a filter index that is different than a destination address associated with the client request. This enables clients to generate client requests for a server installation in a conventional manner without regard to whether a server installation is formed by one server or multiple servers. Accordingly, when a server installation is scaled by increasing the number of servers for redundancy, load distribution or capacity reasons, reconfiguration of the clients utilizing the servers is unnecessary. In one arrangement, the data resides in a data structure having (i) a device identifier that uniquely identifies the server host among multiple server hosts, and (ii) a filter index which is different than the device identifier.

24 Claims, 12 Drawing Sheets

TABLE 1

| 0 | 1 | 2 | 3 | 4 | 5 | 6 | 7 | 8 | 9 | 10 | 11 | } KEY NUMBER 64-1 |
|---|---|---|---|---|---|---|---|---|---|----|----|---|
| 1 | 1 | 1 | 1 | 2 | 2 | 2 | 2 | 3 | 3 | 3  | 3  | } FILTERING DATA COMMUNICATIONS DEVICE INDICATOR 66-1 |
| 1 | 2 | 3 | 4 | 1 | 1 | 2 | 2 | 3 | 3 | 4  | 4  | } SERVER COMPUTER 68-1 |

TABLE 2

| 0 | 1 | 2 | 3 | 4 | 5 | 6 | 7 | 8 | 9 | 10 | 11 | } KEY NUMBER 64-2 |
|---|---|---|---|---|---|---|---|---|---|----|----|---|
| 1 | 1 | 1 | 1 | 2 | 2 | 2 | 2 | 3 | 3 | 3  | 3  | } FILTERING DATA COMMUNICATIONS DEVICE INDICATOR 66-2 |
| 1 | 2 | 3 | 4 | 1 | 1 | 2 | 2 | 3 | 3 | 4  | 4  | } SERVER COMPUTER 68-2 |

TABLE 3

| 0 | 1 | 2 | 3 | 4 | 5 | 6 | 7 | 8 | 9 | 10 | 11 | } KEY NUMBER 64-3 |
|---|---|---|---|---|---|---|---|---|---|----|----|---|
| 1 | 1 | 1 | 1 | 2 | 2 | 2 | 2 | 3 | 3 | 3  | 3  | } FILTERING DATA COMMUNICATIONS DEVICE INDICATOR 66-3 |
| 1 | 2 | 3 | 4 | 1 | 1 | 2 | 2 | 3 | 3 | 4  | 4  | } SERVER COMPUTER 68-3 |

FIG. 5

TABLE 1

| 0 | 1 | 2 | 3 | 4 | 5 | 6 | 7 | 8 | 9 | 10 | 11 |
|---|---|---|---|---|---|---|---|---|---|----|----|
| 1 | 1 | 1 | 1 | 1 | 1 | 3 | 3 | 3 | 3 | 3  | 3  |
| 1 | 2 | 3 | 4 | 1 | 1 | 2 | 2 | 3 | 3 | 4  | 4  |

KEY NUMBER 64-1

FILTERING DATA COMMUNICATIONS DEVICE INDICATOR 66-1

SERVER COMPUTER 68-1

TABLE 3

| 0 | 1 | 2 | 3 | 4 | 5 | 6 | 7 | 8 | 9 | 10 | 11 |
|---|---|---|---|---|---|---|---|---|---|----|----|
| 1 | 1 | 1 | 1 | 1 | 1 | 3 | 3 | 3 | 3 | 3  | 3  |
| 1 | 2 | 3 | 4 | 1 | 1 | 2 | 2 | 3 | 3 | 4  | 4  |

KEY NUMBER 64-3

FILTERING DATA COMMUNICATIONS DEVICE INDICATOR 66-3

SERVER COMPUTER 68-3

FIG. 8

TABLE 1

| 0 | 1 | 2 | 3 | 4 | 5 | 6 | 7 | 8 | 9 | 10 | 11 |
|---|---|---|---|---|---|---|---|---|---|----|----|
| 1 | 1 | 1 | 1 | 2 | 2 | 1 | 2 | 3 | 3 | 3  | 3  |
| 1 | 2 | 3 | 4 | 1 | 1 | 2 | 2 | 3 | 3 | 4  | 4  |

} KEY NUMBER 64-1

} FILTERING DATA COMMUNICATIONS DEVICE INDICATOR 66-1

} SERVER COMPUTER 68-1

TABLE 2

| 0 | 1 | 2 | 3 | 4 | 5 | 6 | 7 | 8 | 9 | 10 | 11 |
|---|---|---|---|---|---|---|---|---|---|----|----|
| 1 | 1 | 1 | 1 | 2 | 2 | 1 | 2 | 3 | 3 | 3  | 3  |
| 1 | 2 | 3 | 4 | 1 | 1 | 2 | 2 | 3 | 3 | 4  | 4  |

} KEY NUMBER 64-2

} FILTERING DATA COMMUNICATIONS DEVICE INDICATOR 66-2

} SERVER COMPUTER 68-2

FIG. 10

TABLE 1

| 0 | 1 | 2 | 3 | 4 | 5 | 6 | 7 | 8 | 9 | 10 | 11 |
|---|---|---|---|---|---|---|---|---|---|----|----|
| 1 | 1 | 1 | 1 | 2 | 2 | 2 | 2 | 3 | 3 | 3  | 3  |
| 1 | 1 | 1 | 1 | 2 | 2 | 2 | 2 | 3 | 3 | 3  | 3  |

- KEY NUMBER 64-1
- FILTERING DATA COMMUNICATIONS DEVICE IDENTIFIER 66-1
- SERVER COMPUTER 68-1

TABLE 2

| 0 | 1 | 2 | 3 | 4 | 5 | 6 | 7 | 8 | 9 | 10 | 11 |
|---|---|---|---|---|---|---|---|---|---|----|----|
| 1 | 1 | 1 | 1 | 2 | 2 | 2 | 2 | 3 | 3 | 3  | 3  |
| 1 | 1 | 1 | 1 | 2 | 2 | 2 | 2 | 3 | 3 | 3  | 3  |

- KEY NUMBER 64-2
- FILTERING DATA COMMUNICATIONS DEVICE INDICATOR 66-2
- SERVER COMPUTER 68-2

TABLE 3

| 0 | 1 | 2 | 3 | 4 | 5 | 6 | 7 | 8 | 9 | 10 | 11 |
|---|---|---|---|---|---|---|---|---|---|----|----|
| 1 | 1 | 1 | 1 | 2 | 2 | 2 | 2 | 3 | 3 | 3  | 3  |
| 1 | 1 | 1 | 1 | 2 | 2 | 2 | 2 | 3 | 3 | 3  | 3  |

- KEY NUMBER 64-3
- FILTERING DATA COMMUNICATIONS DEVICE INDICATOR 66-3
- SERVER COMPUTER 68-3

FIG. 12

METHODS AND APPARATUS FOR TRANSFERRING DATA USING A FILTER INDEX

BACKGROUND OF THE INVENTION

A typical data communications network includes multiple host computers (or hosts) which communicate with each other through a system of data communications devices (e.g., bridges, switches and routers) and transmission media (e.g., electrical cable, fiber-optic cable, and/or wireless connections). In general, a sending host exchanges data with a receiving host by packaging the data using a standard format or protocol to form one or more data-carrying structures (e.g., packets, frames or cells). The sending host then transfers these structures (hereinafter generally referred to as packets) to the receiving host through the above-described system of data communications devices and transmission media. The receiving host then unpackages and uses the data.

Some network arrangements allow hosts to communicate in a client/server manner. That is, one host operates as a client by sending a client request for a particular service to another host which operates as a server. The client request typically takes the form of one or more packets. In general, each of these client request packets includes, in a destination address field, a device address that uniquely identifies the server among the devices on the network. When the client sends the client request packets over the network, data communications devices positioned between the client and the server transfer the client request packets from the client to the server along some optimized network path based on the device address in the destination address field of each packet.

When the server receives the client request packets, the server typically authenticates the client request, provides the requested service (e.g., records a transaction), and sends a reply or confirmation (e.g., one or more reply packets) back to the client. Again, the data communications devices route the reply packets back to the client based on a device address, which identifies the client, in a destination address field of each packet forming the reply.

A server installation is a server configuration formed by one or more servers. To increase capacity at the server installation (i.e., in order to better service large volumes of client requests), it is tempting to increase the number of servers at the server installation. In one arrangement, one or more servers are added to the server installation. In this arrangement, the multiple servers are arranged to "load share" the volume of client requests. That is, each server is configured to independently handle (or share) a particular portion of the load of client requests. If further capacity is required, the server installation can be scaled yet again by adding one or more additional servers in the same load sharing manner. With such an arrangement, it is important to prevent the possibility of two or more load sharing servers in the above-described server installation from providing the same service in response to a single client request.

Another environment which provides load balancing and fault tolerance is a conventional IBM Mainframe environment. In this environment, a source route bridged (SRB), token ring LAN network is used to connect a network of client workstations to a communications controller. One or more of these communications controllers is then attached to the mainframe server computer.

In order to provide load balancing and fault tolerance in this environment, it is common for there to be multiple communications controllers, connected to different rings with the same media access control (MAC) layer address. When a client workstation wishes to connect to the mainframe server, it typically will transmit an "explorer" TEST frame on the token ring. The SRB network, which consists of a number of token ring LAN segments connected by source route bridges, forward the TEST explorer on all the rings of the network, including the multiple rings that contain the communications controllers configured with the server MAC address. One or more of these communications controllers will respond to the TEST explorer and the reply will be transmitted back through the SRB network to the client workstation.

Typically, the first reply that is received by the client workstation will be used. This reply contains a routing information field (RIF) that specifies a path through the SRB network back to the communications controller which sent it. Data packets that are then sent from the client workstation to the communications controller and back again contain this RIF along with the MAC addresses of the client workstation and communications controller. The combination uniquely identifies one of the multiple communications controllers that have the duplicate server MAC addresses.

Using this system, any number of communications controllers can have the same server MAC address as long as they are on different token ring LAN segments with different ring numbers. The client workstation only needs to know a single MAC address to reach any one of these controllers. If more controllers are added, or some are removed, there is no need for the client workstation configuration to be changed. The explorer TEST frames will always find one if one is available.

Networks may further include other specialized devices to coordinate network traffic in an organized fashion. For example, an Internet Protocol (IP) network may include a load director which physically separates two areas of the IP network. During operation, the load director attempts to reduce unnecessary network traffic in each of the two areas by filtering packets based on their IP source addresses. That is, the load director allows certain packets having particular IP source addresses to pass from one area to the other, while blocking passage of other packets having other IP source addresses. Accordingly, each network area is not deluged with unnecessary packets from the other network area. A manufacturer of such a load director is Cisco Systems of San Jose, Calif.

SUMMARY OF THE INVENTION

Due to a variety of technical and economic factors, the cost of implementing an Ethernet based LAN has become much less than the cost of implementing a token ring LAN. Ethernet LANs typically do not use SRB. They typically use transparent bridging to connect Ethernet LAN segments together. Transparently bridged LAN networks do not support multiple devices with the same MAC address. If 2 or more devices on a transparently bridged LAN have the same MAC address, it is an error that must be fixed in order for the LAN to operate properly. This means that the technique described above for providing fault tolerance and load balancing using duplicate MAC addresses cannot be used on a transparently bridged LAN and we must find an alternative.

The invention provides a way for transparently bridged LANs to achieve the same type fault tolerance and load balancing as the source route bridged LAN described above. In particular, the present invention is directed to techniques which enable a server installation to service a client request using a filter index that is different than a destination address associated with the client request. In such an arrangement, a client can generate a client request for a server installation having multiple servers in the same manner as it would for a server installation having a single server. Accordingly, when a server installation is scaled by increasing the number of servers, reconfiguration of the clients utilizing a server of the server installation is unnecessary.

In one embodiment, the data resides in a data structure having (i) a device identifier that uniquely identifies the server host installation (or simply server host) among multiple server hosts, and (ii) a filter index which is different than the device identifier. In this arrangement, a first filtering data communications device receives the data structure. If the filter index of the data structure complies with a first set of filtering criteria residing in the first filtering data communications device, the first filtering device transfers the data structure from the first filtering data communications device to the server host. If the filter index of the data structure does not comply with the first set of filtering criteria, the first filtering data communications device prevents transfer of the data structure from the first filtering data communications device to the server host. Content of the first set of filtering criteria, which resides in the first filtering data communications device, is coordinated with a second set of filtering criteria residing in a second filtering data communications device that is capable of transferring the data structure to the server host such that at most one filtering data communications device transfers the data structure to the server host.

In one arrangement, the first and second sets of filtering criteria are identical. In another arrangement, the first and second sets are similar so long as they direct only one filtering data communications device to handle the transfer of each packet.

In an arrangement where the server host includes multiple server computers (e.g., multiple servers) each of which is identifiable by the device identifier (e.g., the same destination address), transferring the data structure to the server host involves sending the data structure to one of the multiple server computers based on the filter index. Accordingly, only one of the multiple server computers receives the data structure for processing, thus preventing multiple server computers from inadvertently processing the same data structure.

Preferably, the filter index of the data structure includes a source identifier that uniquely identifies a client host among multiple client hosts, and the first set of filtering criteria includes a filter table. In this arrangement, the first filtering data communications device generates a key based on the source identifier of the filter index. Then, the first filtering data communications device selects, from the filter table, a filter table entry based on the key in order to determine whether the filter index complies with the first set of filtering criteria. If a device identifier of the selected filter table entry identifies the first filtering data communications device, the filter index complies with the first set of filtering criteria. If the device identifier of the selected filter table entry does not identify the first filtering data communications device, the filter index does not comply with the first set of filtering criteria.

In one arrangement involving the use of the filter table, the first filtering data communications device includes multiple ports. As such, transferring the data structure from the first filtering data communications device to the server host involves selecting one of the multiple ports of the first filtering data communications device based on the selected filter table entry, and sending the data structure to the server host from the selected one of the multiple ports.

The invention includes a load sharing arrangement. In such an arrangement, the first filtering data communications device transfers, from the first filtering data communications device to the server host, a first data structure provided by a first client host while preventing transfer, from the first filtering data communications device to the server host, of a second data structure provided by a second client host. Such an operation allows the second filtering data communications device to transfer the second data structure provided by the second client host in order to load share transfer of data structures from multiple client hosts to the server host with at most one filtering data communications device transferring each data structure to a particular server host.

In the load sharing arrangement, the first data communications device preferably provides a fault-tolerant feature. That is, the first data communications device can detect a failure of the second filtering data communications device, and transfer a third data structure from the second client host to the server host. Accordingly, when the second filtering data communications device handles a data stream from the second client host to the server host and then fails, the first filtering data communications device takes over for the second filtering data communications device in response to the failure to maintain transfer of the data stream from the second client host to the server host.

Preferably, the load sharing arrangement further includes a load redistribution feature. That is, the first and second filtering data communications devices can form an agreement that includes (i) the first filtering data communications device agreeing to transfer further data structures from the second client host to the server host and that (ii) the second filtering data communications device agreeing not to transfer further data structures from the second client host to the server host. Accordingly, the first filtering data communications device can receive a new data structure from the second client host, and transfer the new data structure to the server host in place of the second filtering data communications device. Such redistribution permits the first and second filtering data communications devices to balance the traffic load of data structures from multiple client hosts to the server host.

Another embodiment of the invention is directed to a computer program product that includes a computer readable medium having instructions stored thereon for transferring data from a client host to a server host. The data resides in a data structure having (i) a device identifier that uniquely identifies the server host among multiple server hosts, and (ii) a filter index that is different than the device identifier. The instructions, when processed by a first filtering data communications device, cause the first filtering data communications device to receive the data structure, and to either transfer the data structure to the server host or prevent transfer of the data to the server host. In particular, the instructions direct the first filtering data communications device to transfer the data structure from the first filtering data communications device to the server host when the filter index of the data structure complies with a first set of filtering criteria residing in the first filtering data communications device. The instructions direct the first filtering data communications device to prevent transfer of the data structure from the first filtering data communications device to the server host when the filter index of the data structure does not comply with the first set of filtering criteria.

Content of the first set of filtering criteria residing in the first filtering data communications device is coordinated with a second set of filtering criteria residing in a second filtering data communications device that is capable of transferring the data structure to the server host such that at most one filtering data communications device transfers the data structure to the server host.

Another embodiment of the invention is directed to a server system for exchanging data with multiple client hosts. In this embodiment, data from a first client host resides in a first data structure having a first device identifier that uniquely identifies a server host among multiple server hosts and a first filter index that is different than the first device identifier. Additionally, data from a second client host resides in a second data structure having a second device identifier that uniquely identifies the server host among the multiple server hosts and a second filter index that is different than the second device identifier. The server system includes a first server computer and a second server computer that form at least a portion of a server host.

The server system further includes multiple filtering data communications devices, coupled to the first and second server computers, which transfer the data from the first and second client hosts to the first and second server computers. In particular, the multiple filtering data communications devices include a first filtering data communications device that receives the first data structure from the first client host and the second data structure from the second client host, and transfers the first data structure to the first server computer without transferring the second data structure to any of the multiple server computers according to a first set of filtering criteria. The multiple filtering data communications devices further include a second filtering data communications device that receives the first data structure from the first client host and the second data structure from the second client host, and transfers the second data structure to the second server computer without transferring the first data structure to any of the multiple server computers according to a second set of filtering criteria. Content of the first set of filtering criteria is coordinated with the second set of filtering criteria and content of the second set of filtering criteria is coordinated with the first set of filtering criteria such that at most one filtering data communications device transfers each of the first and second data structures to the multiple server computers.

In one arrangement of the server system embodiment, the first and second device identifiers are identical. Additionally, the first filtering data communications device is coupled to the first server computer and not coupled to the second server computer, and the second filtering data communications device is coupled to the second server computer and not coupled to the first server computer. This arrangement provides a one-to-one correspondence between the filtering data communications devices and the server computers.

In another arrangement of the server system embodiment, the first and second device identifiers are identical. Furthermore, the first filtering data communications device is coupled to both the first and second server computers, and the second filtering data communications device is coupled to both the first and second server computers. This arrangement provides a mesh configuration between the filtering data communications devices and the server computers.

The above-described features of the invention may be employed in data communications devices and other computerized devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 shows, by way of example only, tables used by the filtering data communications devices of FIG. 4.

FIG. 8 shows, by way of example only, the tables of FIG. 5 after the failover procedure of FIG. 7 is performed.

FIG. 10 shows, by way of example only, the tables of FIG. 8 after the load redistribution procedure of FIG. 9 is performed.

FIG. 12 shows, by way of example only, tables used by the filtering data communications devices of FIG. 11.

DETAILED DESCRIPTION OF PREFERRED EMBODIMENTS

The invention is directed to techniques which enable a server installation to service a client request using a filter index that is different than a destination address associated with the client request in order to enable a client host (or simply client) to generate client requests for a server installation in the same manner regardless of whether the server installation is formed by a single server or multiple servers. Accordingly, server installations can be scaled by changing the number of servers (e.g., from a single server to multiple servers) without any need to reconfigure the client.

Figure 1:
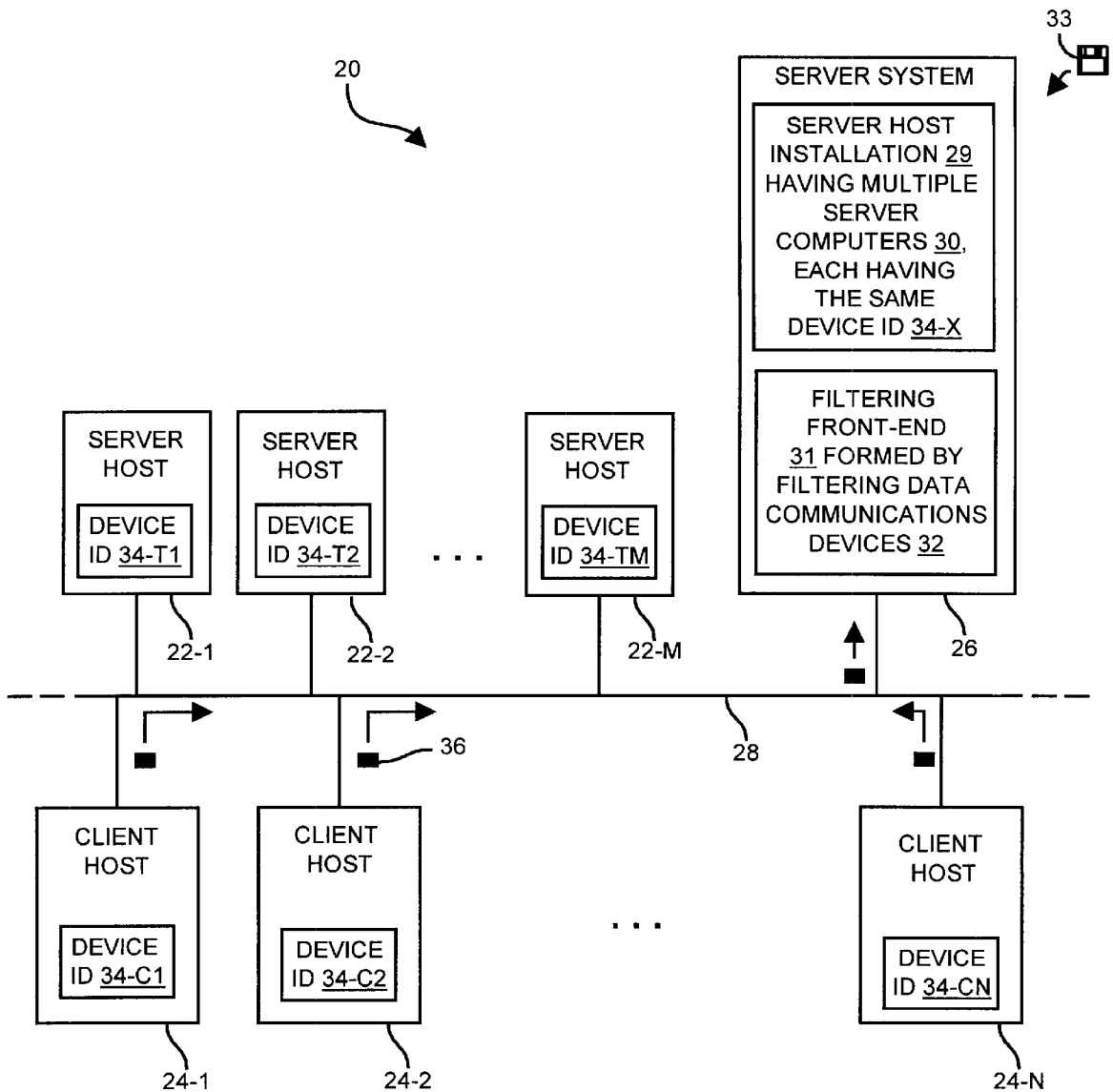
FIG. 1 shows block diagram of a network having a server that is suitable for use by the invention.

FIG. 1 shows a network 20 that is suitable for use by the invention. The network 20 includes multiple server hosts 22-1, . . . , 22-M (collectively, server hosts 22), multiple clients hosts 24-1, . . . , 24-N (collectively, clients hosts 24), a server system 26 and a transmission medium 28, which connects together the server hosts 22, client hosts 24 and server system 26.

In general, the server hosts 22, client hosts 24 and server system 26 are network devices. Each network device has a unique device identifier 34, i.e., a unique network device address. For example, server host 22-1 has a unique device identifier 34-T1, server host 22-2 has a unique device identifier 34-T2, and so on. Similarly, client host 24-1 has a unique device identifier 34-C1, client host 24-2 has a unique device identifier 34-C2, and so on. The server system has a unique device identifier 34-X. Preferably, the device identifiers 34 are conventional media access control (MAC) addresses.

The network devices communicate with each other by exchanging data over the transmission medium 28. In particular, for a first network device to transfer data to a second network device, the first network device packages the data into one or more data structures 36 (e.g., packets, frames or cells), and associates the destination address of the second network device (i.e., the device identifier 34 of that device) with those data structures 36 (hereinafter referred to as packets 36 for simplification). Preferably, the first network device associates the destination address of the second network device with each packet 36 by storing the destination address in a destination address field of each packet 36. The first network device then sends each packet 36 over the transmission medium 28 to the second network device.

When the second network device receives a packet 36, the second network device compares the destination address associated with that packet with the second network device's address (i.e., the device identifier 34 of the second network device). That is, the second network device reads the contents of the destination address field of the received packet, and compares the read contents with its device identifier 34. If the contents match its device identifier 34, the second network device has confirmed that it is the intended recipient and subsequently processes the data contained within the received packet 36. If the contents do not match its device identifier 34, the second network device ignores the received packet 36.

It should be understood that, by way of example only, the client hosts 24 are configured to communicate with the server hosts 22 in a client/server manner. That is, the server hosts 22 (see FIG. 1) are configured to operate as conventional server installations, each server installation having a single server. Accordingly, each client host 24 is capable of sending a client request to a server host 22 through the transmission medium 28 in a conventional manner such that the client request includes the device identifier 34 of the server host 22 in the destination address field of the client request. Furthermore, in a conventional manner, each server host 22 is capable of providing a service back to the client host 24 in response to such a client request.

It should be further understood that the server system 26 is configured to operate as a server installation by providing services in response to client requests from the client hosts 24. As illustrated in FIG. 1, the server system 26 includes a server host installation 29 and a filtering front-end 31. The server host installation 29 includes multiple server computers 30. Each server computer 30 is configured to operate as a server, and uses the same device identifier 34-X. That is, each server computer 30 is capable of providing a service in response to a client request having the device identifier 34-X as a destination address.

The filtering front-end 31 includes multiple filtering data communications devices 32 which transfer client requests (packets 36) between the transmission medium 28 and the multiple server computers 30 of the server host installation 29 such that exactly one server computer 30 (exactly one server) receives each client request. Accordingly, there is no possibility for multiple server computers 30 providing the same service in response to a single client request.

Moreover, it should be understood that the server system 26 is scalable by changing the number of server computers 30 or the number of filtering data communications devices of the server system 26, and that such changes do not require reconfiguration of the client hosts 24 in order to maintain a client/server relationship with the client hosts 24. Rather, regardless of the number of server computers 30 of the server host installation 29, and regardless of any change in the number of server computer 30 of the server host installation 29, and regardless of the number of filtering data communications devices, the client hosts 24 can exchange data with the server system 26 by sending the server system 26 a packet 36 (e.g., a client request) having the device identifier 34-X as a destination address. Accordingly, the client hosts 24 are capable of communicating with the server system 26 (e.g., obtaining service from the server system 26) in the same manner as that used when communicating with the server hosts 22. No reconfiguration of the client hosts 24 is required.

The server system 26 operates in accordance with a set of instructions, which are provided by a computer program product 33. In particular, the instructions direct the server system 26 to operate as a server installation that provides service to the client hosts 24 in response to client requests. In one arrangement, the instructions form a portion of an operating system such as the Cisco IOS manufactured by Cisco Systems, Inc. of San Jose, Calif. In another arrangement, the instructions are shipped separately from such an operating system (e.g., shipped separately in the computer program product 33, or downloaded from a network server, etc.).

Figure 2:
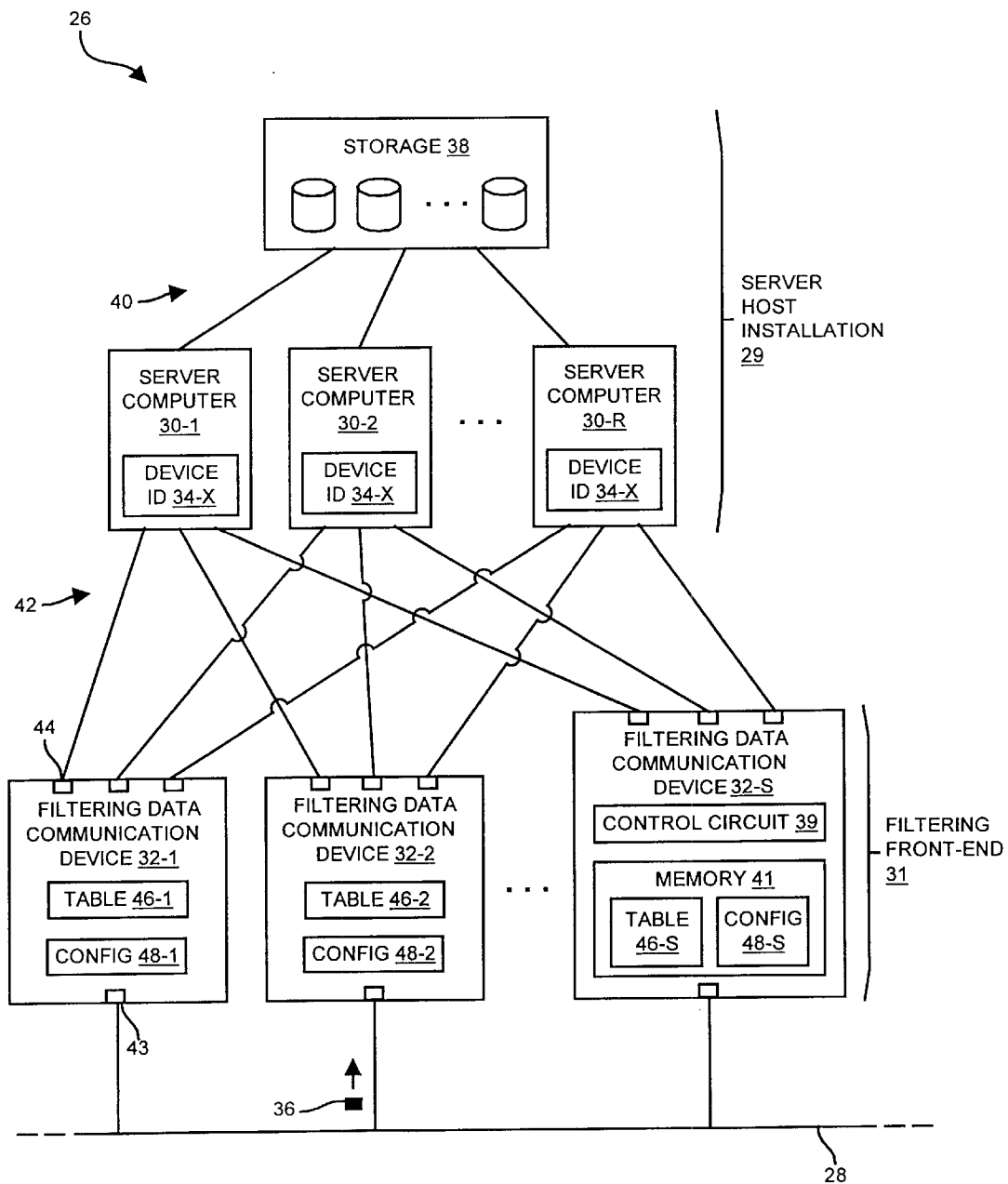
FIG. 2 shows a more detailed block diagram of the server of FIG. 1 that is suitable for use by the invention.

Further details of the server system 26 will now be explained with reference to FIG. 2 which shows a general arrangement of server system components. The server host installation 29 includes multiple server computers 30-1, . . . , 30-R and a storage facility 38. The storage facility 38 is preferably centralized as shown in FIG. 2. Alternatively, the storage facility can be distributed locally, at least in part, among the server computers 30. The server computers 30 store data to and retrieve data from the storage facility 38 through a set of connections 40. The data may include the instructions that direct the operation of the server system 26, data related to client requests, or other computerized data.

As shown in FIG. 2, the filtering front-end 31 includes multiple filtering data communications devices 32-1, . . . , 32-S. Each filtering data communications device 32 includes a control circuit 39 and memory 41 (shown only in the filtering data communications device 32-S of FIG. 2 for simplicity), as well as a port 43 that connects to the transmission medium 28, and ports 44 that connect to server computers 30 of the server host installation 29 through a set of connections 42. The memory 41 of each filtering data communications device 32 stores a respective table 46 and respective configuration information 48 which filtering data communications device 32 uses to transfer or prevent the transfer of a packet 36 between the transmission medium 28 and the server host installation 29.

Figure 3:
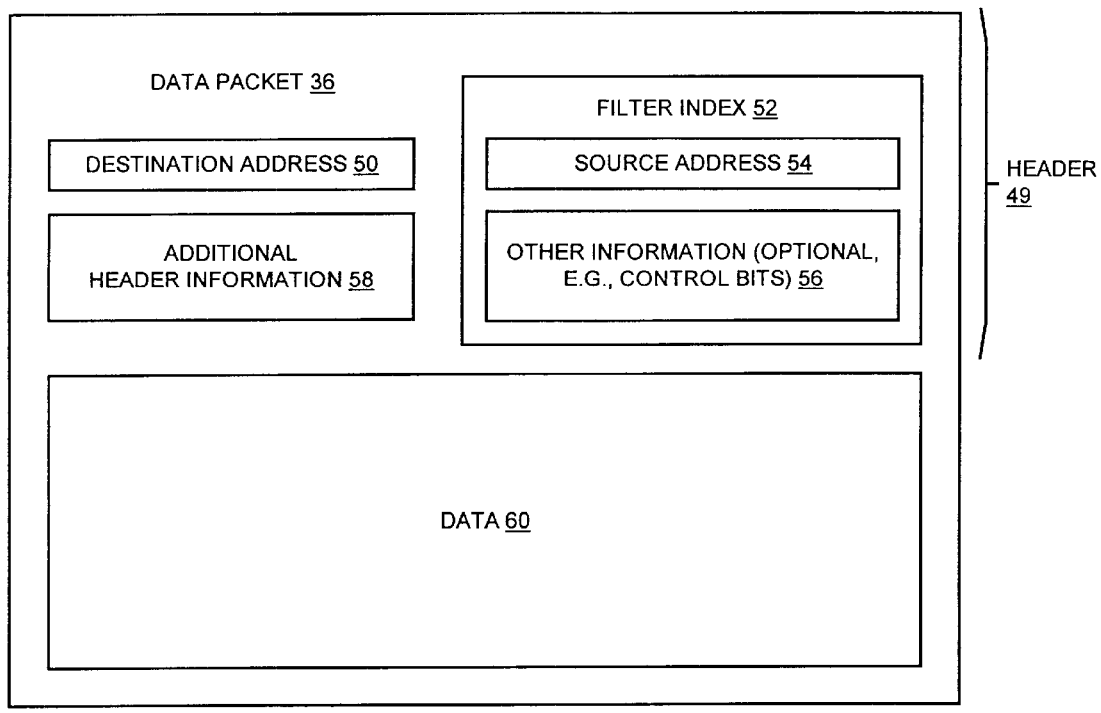
FIG. 3 shows block diagram of a data packet that is suitable for use by the server of FIG. 2.

Further details of a packet 36 will now be provided with reference to FIG. 3. Each packet 36 includes a header portion 49 and a data portion 60. The header portion includes a destination address field 50 and a filter index 52 that is different than the destination address field 50. The destination address field 50 of the packet 36 stores a destination address (i.e., a device identifier 34) that identifies the intended recipient of the packet 36. It is the contents of the destination address field 50 of each packet 36 that each network device checks upon receipt to determine whether it is the intended recipient of that packet 36.

The filter index 52 of a packet 36 includes a source address 54 (i.e., the device identifier 34) that identifies the source or originator of that packet 36. Optionally, the filter index 52 of the packet 36 includes other information such as control bits indicating a desired quality of service for that packet 36.

The packet 36 may include additional header information 58 such as parity, start and stop bits, etc. The data portion 60 of the packet 36 includes data (e.g., a client request) intended for transfer between the sending network device and its intended recipient. One skilled in the art will understand that various standard packet formats (e.g., Internet Protocol) are suitable for the packet 36.

It should be understood that, since the filtering index is formed by a source address and perhaps additional control information, which the client hosts 24 typically provide during normal operation when communicating with the server hosts 22, there is no additional burden placed on the client hosts 24 when the client hosts 24 communicate with the server system 26. Accordingly, the client hosts 24 do not require reconfiguration to communicate with the server system 26 when the number of server computers 30 or the number of filtering data communications devices at the server system 26 changes.

Figure 4:
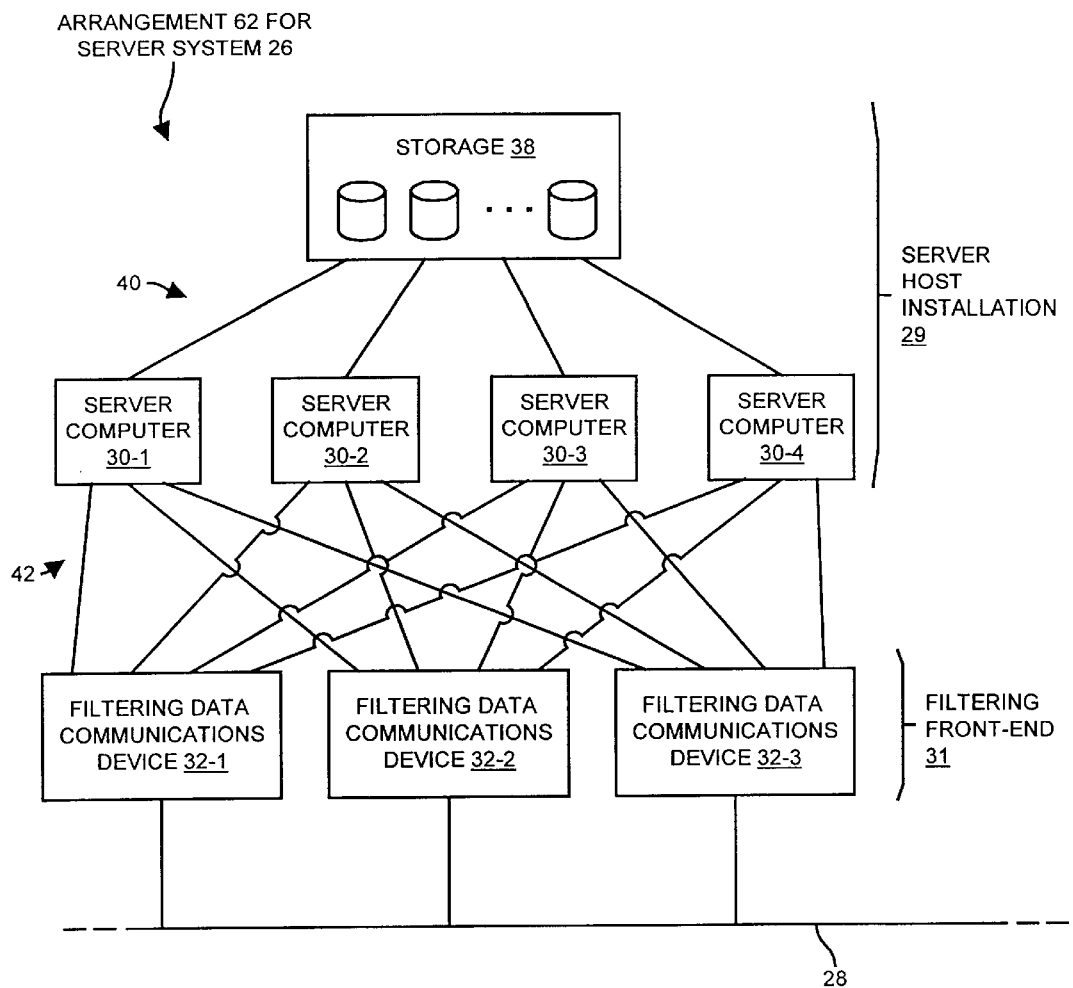
FIG. 4 shows, by way of example only, a block diagram of a server that is suitable for use by the invention, the server including three filtering data communications devices and four server computers.

Further details of how the server system 26 handles conventional client requests formatted for single server installations will now be provided with reference to FIG. 4, which shows a server installation arrangement 62 for the server system 26. As shown in FIG. 4, the server installation arrangement 62 includes a mesh configuration of connections 42 that connect the filtering data communications devices 32 of the filtering front-end 31 with the server computers 30 of the server host installation 29. In particular, each filtering data communications device 32 connects with multiple server computers 30 through the mesh configuration of connections 42. Accordingly, each filtering data communications device 32 has the capability to provide a packet 36 to any of the server computers 30 to which it connects.

As explained earlier, each filtering data communications device 32 uses a table 46 (see FIG. 2) to determine which server computer 30 should receive a packet 36. By way of example only, the respective tables 46 for the filtering data communications devices 32-1, 32-2 and 32-3 are shown in FIG. 5. In particular, TABLE 1 (also see table 46-1 in FIG. 2) is used by filtering data communications device 32-1, TABLE 2 (also see table 46-2 in FIG. 2) is used by filtering data communications device 32-2, and TABLE 3 is used by filtering data communications device 32-3.

Each table 46 has multiple entries (columns) formed by multiple fields. By way of example only, TABLE 1 (as well as the other two tables) has 12 entries. The entry of each table has three fields including a key number field 64, a filtering data communications device indicator field 66, and a server computer field 68. For example, the shaded entry of TABLE 1 has 5 as the contents of its key number field 64-1, 2 as the contents of its filtering data communications device indicator field 66-1, and 1 as the contents of its server computer field 68-1.

Figure 6:
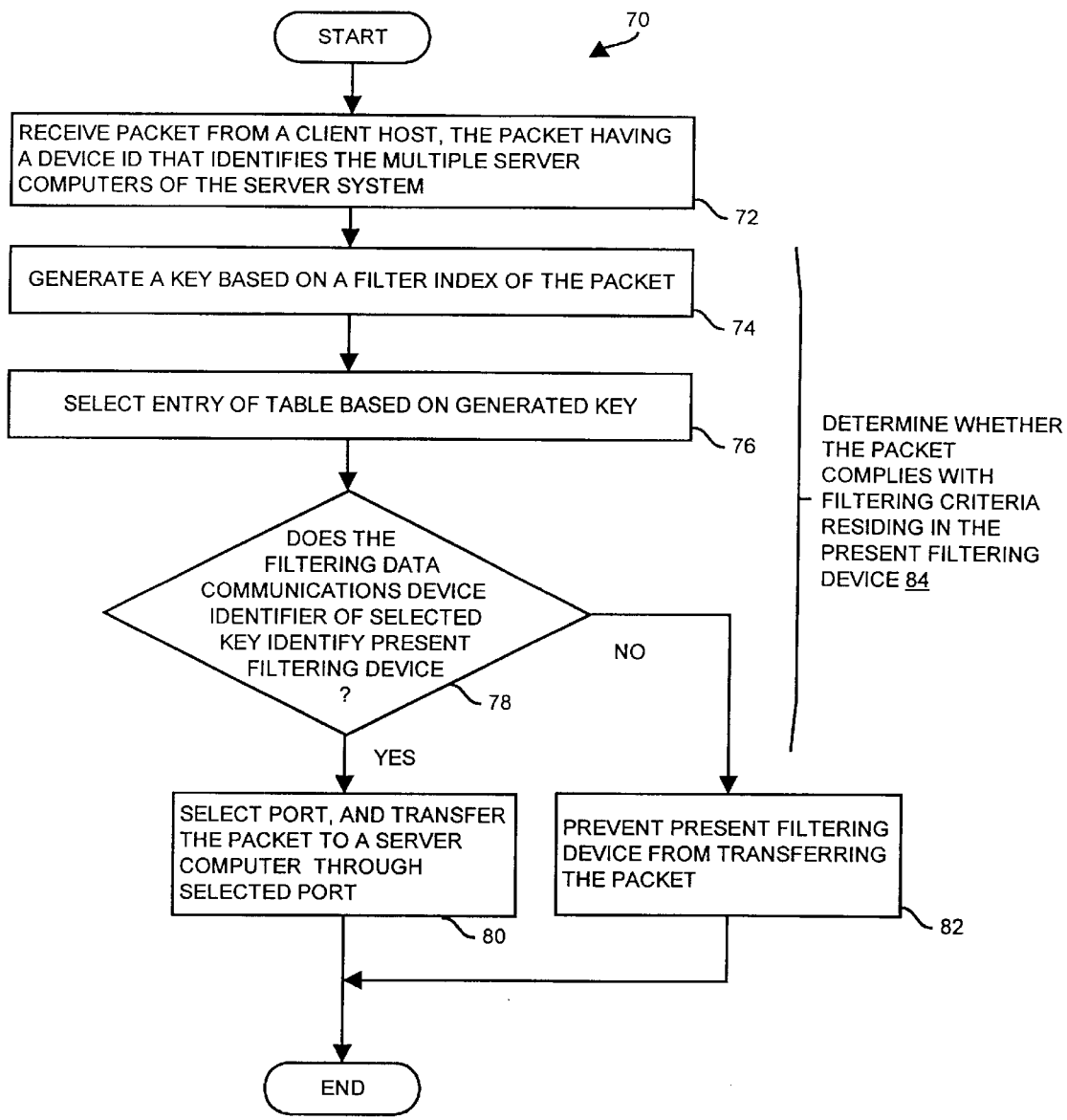
FIG. 6 shows a flow diagram of a normal operating procedure performed by a filtering data communications device in accordance with the invention.

Further details of how the filtering data communications devices 32 use the tables 46 will now be provided with reference to FIG. 6 which shows a procedure 70 performed by each filtering data communications device 32 of the arrangement 62 of FIG. 4 when it receives a packet 36 having, in its destination address field 50, the device identifier 34-X of the server computers 30. In step 72, each filtering data communications device 32 individually receives the packet 36 and determines that the server host installation 29 is the intended recipient. In step 74, each filtering data communications device 32 generates a key based on a filter index 52 of the packet 36 (see FIG. 3). A conventional mapping or hashing function is suitable for use in step 74. For example, suppose that the filter index 52 is exclusively the source address 54 (see FIG. 3) of the packet 36. A standard modulo operation that generates, as a key, remainders between 0 through 11 from the source address 54 is suitable to select one of the 12 entries of a table in FIG. 5. As another example, the hash result is the sum of the bytes of the filter index 52 (e.g., the number of bytes in the source address 54). Other examples of mapping and hashing techniques are available from GNU, which is provided by the Free Software Foundation, Inc. of Boston, Mass. By way of example only, suppose that the key generated in step 74 for the packet 36 is 5.

In step 76, each filtering data communications device 32 selects an entry (column) of its respective table 46 based on the key generated in step 74. In the example above, the key is 5. Accordingly, the filtering data communications device 32-1 selects the shaded entry in TABLE 1, the filtering data communications device 32-2 selects the shaded entry in TABLE 2, and the filtering data communications device 32-3 selects the shaded entry in TABLE 3.

In step 78, each filtering data communications device 32 inspects the filtering data communications device indicator field 66 of the selected entry to determine whether it is the filtering data communications device 32 that is responsible for transferring the packet 36 to a server computer 30 of the server host installation 29. In each table of the example, the filtering data communications device indicator field 66 equals 2 indicating that the second filtering data communications device 32-2 is responsible for transferring the packet 36. Accordingly, filtering data communications device 32-1 will check field 66-1 of the fifth entry of TABLE 1 and determine that it is to proceed to step 82 which involves preventing transfer of the packet 36. Similarly, filtering data communications device 32-3 will check field 66-3 of the fifth entry of TABLE 3 and determine that it is to proceed to step 82 which involves preventing transfer of the packet 36. However, filtering data communications device 32-2 will check field 66-2 of the fifth entry of TABLE 2 and determine that it is to proceed to step 80.

In step 80, the filtering data communications device 32-2 selects a port 44 (see FIG. 2) based on the device identifier of the selected key, and transfers the packet 36 to a particular server computer 30 through that port 44. In the example, the filtering data communications device 32-2 finds that the server computer identifier 68-2 stores 1 directing the filtering data communications device 32-2 to transfer the packet 36 through its first port to server computer 30-1.

Accordingly, only one filtering data communications device 32 transfers the packet 36 to a server computer 30. The other filtering data communications devices 32 prevent transfer of the packet 36 (e.g., ignore further processing of the packet 36) to the server computers 30. As a result, each table 46 is essentially filtering criteria used by a respective filtering data communications device 32, and steps 74 through 78 essentially form a general step 84 of determining whether the packet 36 complies with the filtering criteria of a particular filtering data communications device 32.

It should be understood that the tables 46 (i.e., filtering criteria) are related to each other. In one arrangement, the first and second sets of filtering criteria are identical. As such, when performing the procedure 70, each filtering data communications device 32 generates the same end result as to which filtering data communications device 32 should handle conveyance of a packet to the server host installation 29. In another arrangement, the first and second sets of filtering criteria are similar, but not identical, so long as the sets of filtering criteria direct only one filtering data communications device to handle the transfer of each packet.

When server computer 30-1 receives the packet 36 from the filtering data communications device 32-2, the server computer 30-1 processes the packet 36. For example, if the packet 36 is a client request (e.g., a request to record a bank deposit that deposits funds into a particular bank account), the server computer 30-1 provides the requested service (e.g., records the bank deposit and sends a reply back to the client host 24 that sent the packet 36 by referring to the source address 54 of the packet 36).

Since only one of the filtering data communications devices 32 transfers the packet 36 to a server computer 30, there will be only one server computer 30 that services the packet 36. In the example above, only filtering data communications device 32-2 transfers the packet 36. Filtering data communications devices 32-1 and 32-3 prevent transfer of the packet 36. Accordingly, multiple server computers 30 will not inadvertently provide the same service in response to a single client request.

It should be understood that the common function used by the filtering data communications devices 32 will generate different keys (when performing step 74, see FIG. 6) due to the various source addresses in the source address fields 54 of the packets 36. Therefore, different filtering data communications devices 32 will transfer packets from different client hosts 24. This feature of the invention results in load sharing of the client requests.

Preferably, the number of entries in the tables 46 is significantly larger than the number of filtering data communications devices 32 in order to provide greater flexibility in the manner in which the devices 32 are configured to route packets from the transmission medium 28 to the server computers 30.

Figure 7:
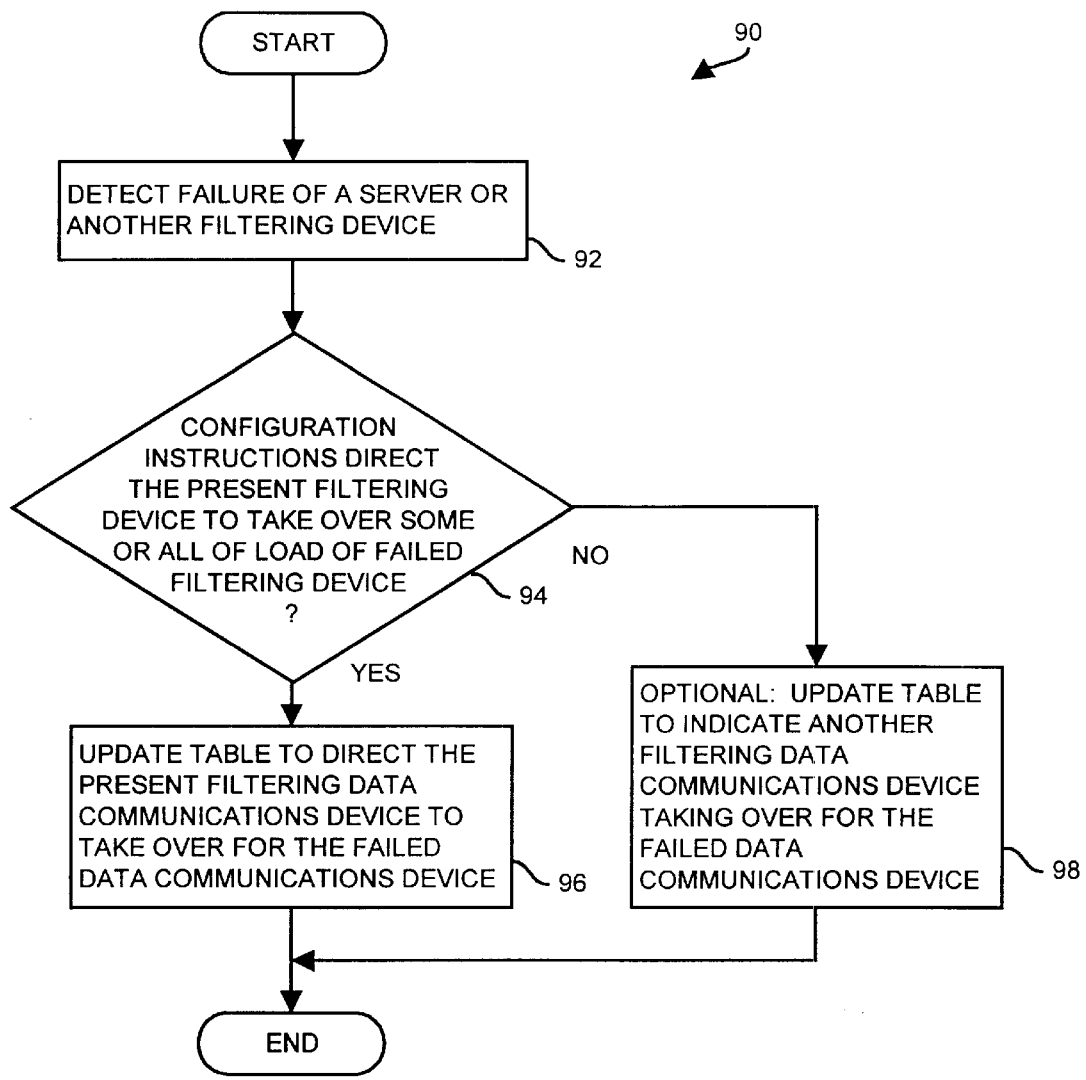
FIG. 7 shows a flow diagram of a failover procedure performed by a filtering data communications device in accordance with the invention.

Further details of the invention will now be provided with reference to FIG. 7. Each filtering data communications device 32 preferably has the capability to detect failures of another filtering data communications device 32. For example, filtering data communications device 32-2 can be configured using the configuration information 48-2 (see FIG. 2) to expect a heartbeat from filtering data communications device 32-1. If the filtering data communications device 32-2 does not receive a heartbeat from the filtering data communications device 32-1 within a particular timeout period (as determined by the configuration information 48-2), the filtering data communications device 32-2 concludes that the filtering data communications device 32-1 has failed, and reconfigures itself to handle the load previously handled by the filtering data communications device 32-1. Other communications mechanisms are suitable for determining whether a device has failed such as ping, broadcasts, direct communications, and spanning tree protocol mechanisms.

It should be understood that the arrangement of the server host 26 provides server scalability without client reconfiguration. In particular, the server host installation 29 can be scaled further by changing the number of server computers 30 (e.g., adding a server computer 30) forming the installation 29. When such a change is made to the server host installation 29, the tables 46 of the filtering data communications devices 32 of the filtering front-end 31 can be adjusted (e.g., by adding entries that direct a share of client requests to the newly added server computer 30) to reflect the change. No reconfiguration of the client hosts 24 is necessary. Rather, each client host 24 can continue to provide the server system 26 with client requests in the same manner as it would to a server installation with a single server (e.g., one of the server hosts 22).

FIG. 7 shows a procedure 90 performed by each filtering data communications device 32 upon the detection of a failure of another filtering data communications device 32. Such a procedure 90 enables traffic to be shifted dynamically from a failed server computer 30 to another server computer 30. In step 92, each remaining filtering data communications device 32 detects a failure of a particular filtering data communications device (e.g., through the loss of a heartbeat from that filtering data communications device).

In step 94, each remaining filtering data communications device 32 checks respective configuration information 48 (also see FIG. 2) to determine whether it is to take over for the failed filtering data communications device 32. If so, step 94 proceeds to step 96. Otherwise, step 94 proceeds to step 98. The configuration information 48 of each filtering data communications device 32 should be such that only one filtering data communications device 32 takes over upon the failure of another.

In step 96, the filtering data communications device 32 taking over the failed filtering data communications device 32 updates its table to reflect the takeover. In step 98, other filtering data communications devices 32 may update their respective tables to record the takeover. Such taking over of a failed filtering device 32 by another device 32 is transparent to the client hosts 24 and provides redundancy without any client reconfiguration.

It should be understood that when other filtering data communications devices 32 update their respective tables 46 to record the above-described takeover (i.e., see step 98 in FIG. 7) the tables (i.e., filtering criteria) in the filter data communications devices are identical. However, if the other filtering data communications devices 32 do not update their respective tables 46 to record the takeover, the tables 46 are not identical but similar. Nevertheless, in this situation, the tables 46 are still related and coordinated with each other such that they direct only one filtering data communications device to handle the transfer of each packet 36.

FIG. 8 illustrates, by way of example only, the changes to the tables 46 of FIG. 5 in response to a failure of the filtering data communications device 32-2. Suppose that the respective configuration information 48 in each of the remaining filtering data communications devices 32-1 and 32-3 indicates that both filtering data communications device 32-1 and 32-3 should take over if the filtering data communications device 32-2 should fail. Upon detection of such a failure (step 92 in FIG. 7), the remaining filtering data communications devices 32-1 and 32-3 check their respective configuration information 48 (step 94) to determine which device is to takeover for the failed device.

As shown in FIG. 8 and in accordance with the configuration information 48-1, the filtering data communications device 32-1 updates entries 4 through 7 (identified by key number 64) to indicate that it should take over handling packets 36 that correspond to entries 4 and 5 and that filtering data communications device 32-3 should take over handling packet 36 that corresponding to entries 6 and 7 (step 96). Similarly, in accordance with the configuration information 48-3, the filtering data communications device 32-3 updates entries 4 through 7 to indicate that it should take over handling packets 36 that correspond to entries 6 and 7 and that filtering data communications device 32-1 should take over handling packet 36 that corresponding to entries 4 and 5 (also step 96). Accordingly, if the filtering front-end 31 receives a new packet 36 following a failure of filtering data communications device 32-2, and the new packet hashes to entry 4 (see the shaded entry in FIG. 8), the filtering data communications device 32-1 will handle transferring that packet 36 to server computer 30-1.

It should be understood that the respective configuration information 48 should be manually predetermined to be coordinated or under control of a programmed mechanism such that the remaining filtering data communications devices 32 agree as to which devices 32 take over for a failed device 32. Due to the arrangement of the tables 46, flexibility exists enabling a variety of failover strategies other than that provided in the example above. For instance, the filtering data communications devices 32 can be configured such that exactly one remaining device 32 takes over for a failed device 32. Alternatively, the load of a failed device 32 can be evenly distributed among remaining devices 32. As another alternative, the load of a failed device can be given to the least loaded device 32 (e.g., using a bidding algorithm) provided that the remaining devices 32 configure themselves to prevent devices 32 other than the least loaded device from handling the load of the failed device 32. One skilled in the art will understand that other failover strategies can be implemented as well.

The filtering data communications devices 32 preferably have the capability to detect failures of the server computers 30. In one arrangement, the filtering data communications devices 32 are configured to expect heartbeats (or to use other suitable forms of communication such as ping, HSRP mechanisms, etc.) from the server computers 30 in a manner similar to that described above for detecting failures of other filtering data communications devices 32. Upon a detection of a failed server computer 30, the filtering data communications devices 32 adjust their respective tables 46 to direct packets to server computers 30 other than the failed server computer 30 to provide fault tolerance (or simply to redistribute server load).

Figure 9:
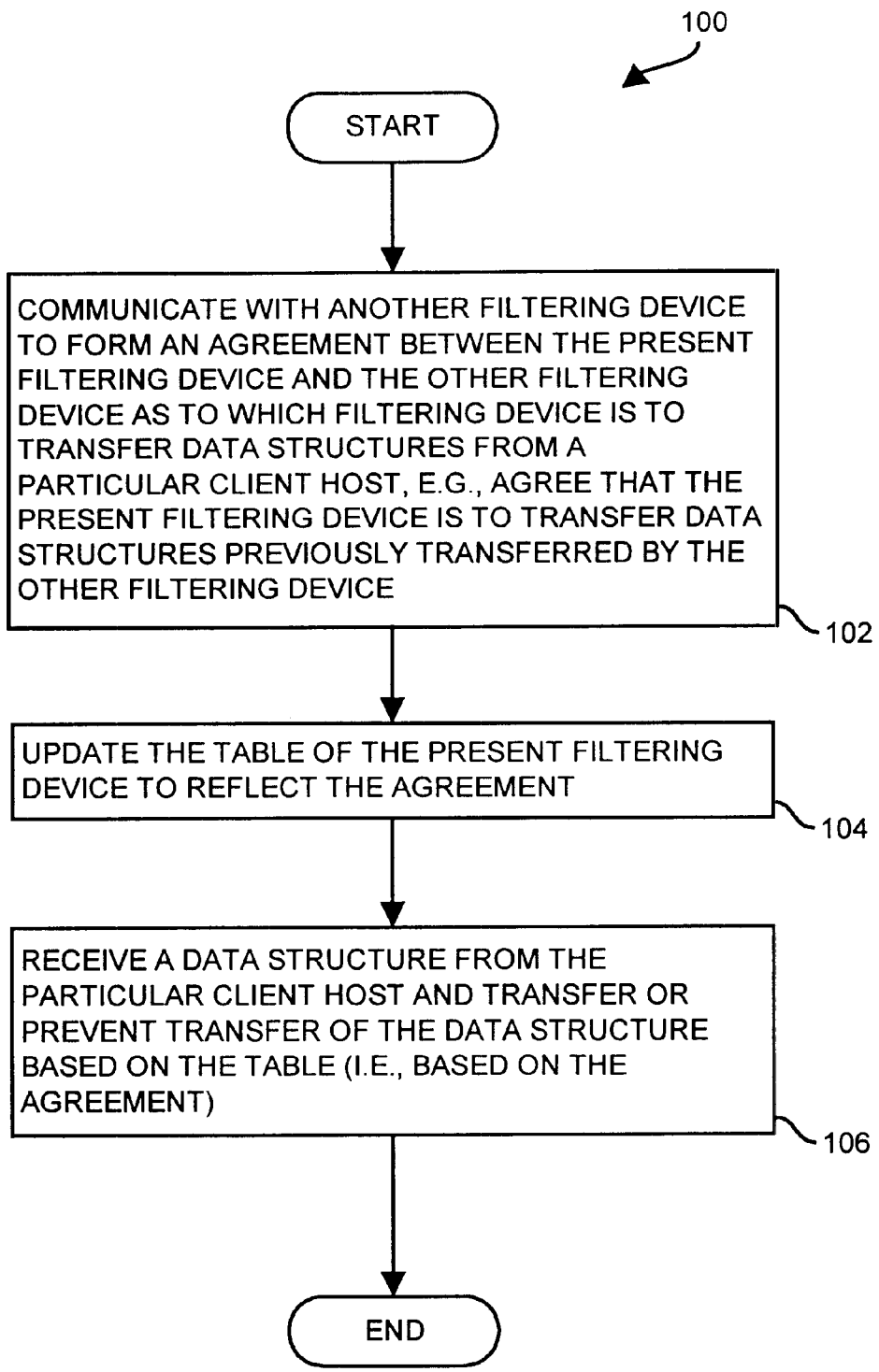
FIG. 9 shows a flow diagram of a load redistribution procedure performed by a server in accordance with the invention.

FIG. 9 illustrates a load redistribution procedure 100 of the invention in which the filtering data communications devices 32 communicate with each other to redistribute the load of client requests sent from the client hosts 24 to the server computers 30. In step 102, two (or more) filtering data communications devices 32 form an agreement as to how the load between the filtering data communications 32 should be redistributed. In step 104, each filtering data communications device 32 updates its respective table 46 to reflect the agreement. In step 106, each filtering data communications device 32 then operates in accordance with the agreement by transferring a new packet 36 or preventing transfer of the new packet 36 based on the agreement, i.e., using the tables 46. Such rebalancing or redistribution of the load of client requests is transparent to the client hosts 24 and does not require any reconfiguration of the client hosts 24.

FIG. 10 illustrates updated respective tables 46 of FIG. 5 for two filtering data communications devices 32. The tables of FIG. 10 have been updated to reflect an agreement to redistribute the load of client requests. A comparison of TABLE 1 in FIG. 10 with TABLE 1 in FIG. 5 will show that filtering data communications device 32-1 has adjusted Entry 6 of TABLE 1 such that filtering data communications device 32-1 now handles packets 36 that generate a key of 6 rather than filtering data communications device 32-2. Similarly, a comparison of TABLE 2 in FIG. 10 with TABLE 2 in FIG. 5 will show that filtering data communications device 32-2 has adjusted Entry 6 of TABLE 2 such that filtering data communications device 32-1 now handles packets 36 that generate a key of 6. Since such adjustments can be made while the server system 26 is in operation (i.e., while providing services in response to client requests) such load redistribution can be viewed as a technique for dynamic load balancing. Furthermore, since changes to the tables 46 are all that is required to effectuate such load balancing, there is no reconfiguration needed at the client hosts 24.

Figure 11:
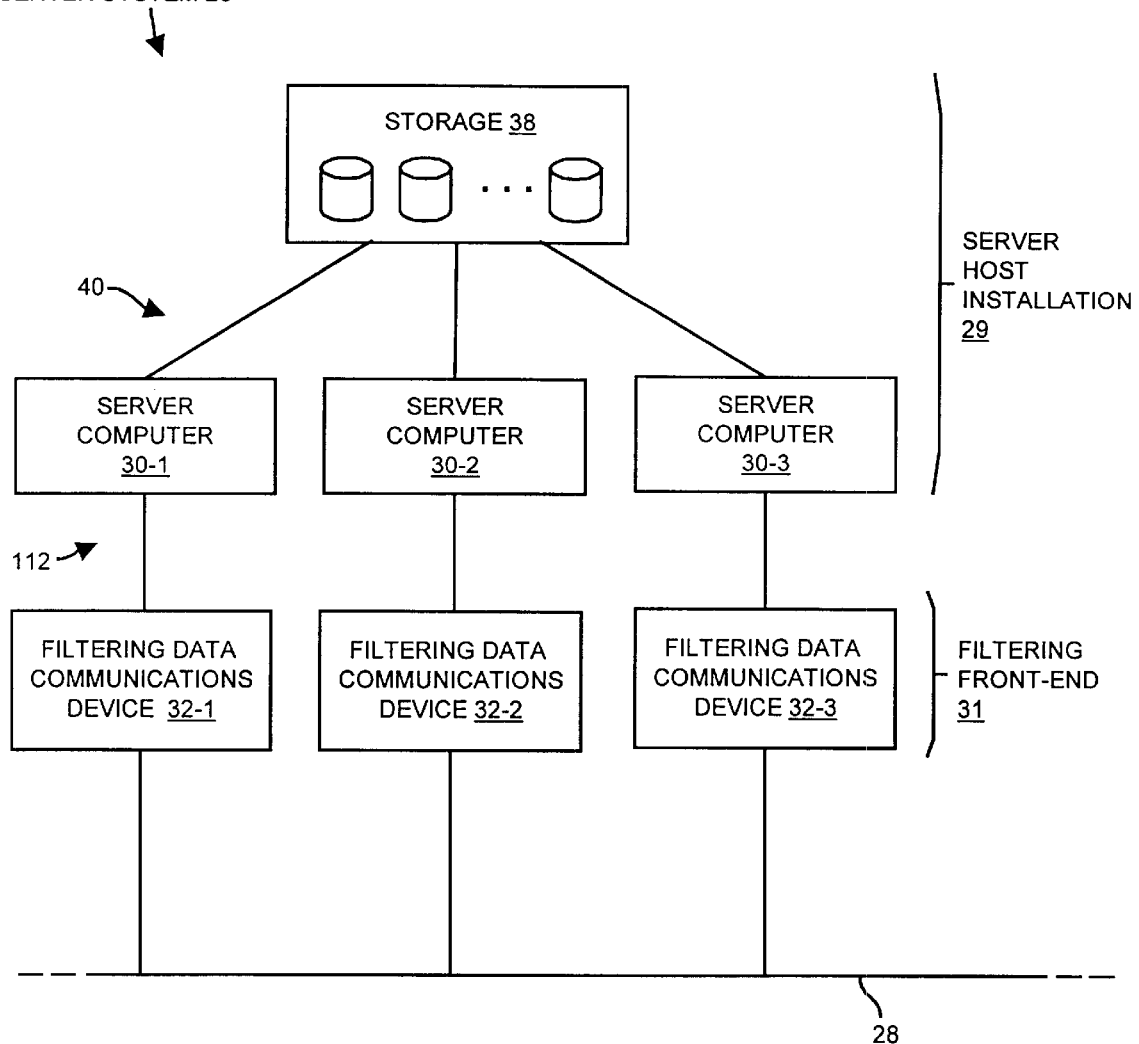
FIG. 11 shows, by way of example only, a block diagram of a server that is suitable for use by the invention, the server including three filtering data communications devices and three server computers connected to the three filtering data communications devices in a one-to-one configuration.

It should be understood that other configurations of server computers 30 and filtering data communications devices 32 can be made to achieve particular results. For example, an arrangement 110 is shown in FIG. 11. The arrangement 110 has a one-to-one correspondence between the server computers 30 and the filtering data communications devices 32. In particular, each filtering data communications device 32 operates as a dedicated front-end filter for that server computer. This is also evidenced by the single dedicated connections 112 between the filtering data communications devices 32 and the server computers 30. An example of tables 46 that are suitable for use by the arrangement 110 is shown in FIG. 12. It should be understood that the filtering data communications device indicator fields 66 are identical to the server computer identifier fields 68 for each table for this arrangement.

The invention as described above enables a server installation to service a client request using a filter index that is different than a destination address associated with the client request in order to enable a client to generate client requests for a server installation in the same manner regardless of whether the server installation is formed by a single server or multiple servers. Thus, server installations can be scaled by changing the number of servers (e.g., from a single server to multiple servers) without any need to reconfigure the clients. For example, the additional of another server computer 30 to the server host installation 29 merely requires updating of the respective tables 46 used by the filtering data communications devices 32 such that packets 36 from particular client hosts 24 or of a particular class of service are transferred to the new server computer 30. No reconfiguration of the client hosts 24 is required. These features may be particularly useful in computerized devices (e.g., data communications devices) such as those manufactured by Cisco Systems, Inc. of San Jose, Calif.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the transmission medium 28 need not be arranged in a transmission line form, as shown in FIG. 1. Rather, other topologies and configurations are suitable for use by the invention. In particular, the transmission medium 28 may include computerized data communications devices (e.g., routers, hubs, switches, fiber-optic devices, wireless communications mechanisms, etc.) or any combination thereof.

For instance, the mesh arrangement (e.g., see FIG. 4) can be instantiated using encapsulated traffic over any communication medium. By way of example, on the "client" side of the arrangement, N bridges may filter traffic. However, on the other side, those N bridges use TCP connections to each of the servers. Accordingly, the bridges pass along their traffic over the TCP connections rather than over point-to-point links.

Additionally, the device identifiers 34 are not necessarily MAC addresses that uniquely identify an individual machine. Rather, the device identifiers 34 can be other types of addresses such as an Internet Protocol (IP) address. For example, they may include Quality of Service (QoS) indicators where clients can get different levels of service at different servers. Moreover, the identifiers can be multicast addresses or broadcast addresses.

Furthermore, although FIG. 11 shows a server system arrangement 110 having three server computers 30 and three filtering data communications devices 32, it should be understood that the number of server computers 30, R, and the number of filtering data communications devices 32, S, are not necessarily equal (also see FIG. 2). By way of example, the server system arrangement 62 in FIG. 4 has four server computers 30 and three filtering data communications devices 32.

A benefit to increasing the number of server computers 30 in the server host installation 29 is that such an increase results in increased service providing capacity. A few benefits to increasing the number of filtering data communications devices 32 in the filtering front-end 31 include reducing the average traffic load through any particular filtering data communications device 32, increasing flexibility for load redistribution, and improving filtering data communications device failover options to provide enhanced fault-tolerance.

The above-described features of the invention may be particularly useful in computerized devices manufactured by Cisco Systems, Inc. of San Jose, Calif.

What is claimed is:

1. A method for transferring data from a client host to a server host, the data residing in a data structure having (i) a device identifier that uniquely identifies the server host among multiple server hosts and (ii) a filter index that is different than the device identifier, the method comprising the steps of:

receiving the data structure in a first filtering data communications device;

transferring the data structure from the first filtering data communications device to the server host when the filter index of the data structure complies with a first set of filtering criteria residing in the first filtering data communications device; and preventing transfer of the data structure from the first filtering data communications device to the server host when the filter index of the data structure does not comply with the first set of filtering criteria, wherein content of the first set of filtering criteria residing in the first filtering data communications device is coordinated with a second set of filtering criteria residing in a second filtering data communications device that is capable of transferring the data structure to the server host such that at most one filtering data communications device transfers the data structure to the server host.

2. The method of claim 1 wherein the server host includes multiple server computers each of which is identifiable by the device identifier, and wherein the step of transferring includes the step of:

sending the data structure to one of the multiple server computers based on the filter index.

3. The method of claim 1 wherein the filter index of the data structure includes a source identifier that uniquely identifies the client host among multiple client hosts, wherein the first set of filtering criteria includes a filter table, and wherein the method further comprises the steps of:

generating a key based on the source identifier of the filter index; and selecting, from the filter table, a filter table entry based on the key in order to determine whether the filter index complies with the first set of filtering criteria, wherein the filter index complies with the first set of filtering criteria when a device identifier of the selected filter table entry identifies the first filtering data communications device, and wherein the filter index does not comply with the first set of filtering criteria when the device identifier of the selected filter table entry does not identify the first filtering data communications device.

4. The method of claim 3 wherein the first filtering data communications device includes multiple ports, and wherein the step of transferring the data structure from the first filtering data communications device to the server host when the filter index of the data structure complies with filtering criteria residing in the filtering data communications device includes the steps of:

selecting one of the multiple ports of the first filtering data communications device based on the selected filter table entry; and sending the data structure to the server host from the selected one of the multiple ports.

5. The method of claim 1 wherein the step of transferring the data structure from the first filtering data communications device to the server host includes the step of:

selecting one of multiple server hosts based on the filter index of the data structure, each of the multiple server hosts having an identical media access control address.

6. A method for transferring data from a client host to a server host, the data residing in a data structure having (i) a device identifier that uniquely identifies the server host among multiple server hosts and (ii) a filter index that is different than the device identifier, the method comprising the steps of:

receiving the data structure in a first filtering data communications device;

transferring the data structure from the first filtering data communications device to the server host when the filter index of the data structure complies with a first set of filtering criteria residing in the first filtering data communications device; and preventing transfer of the data structure from the first filtering data communications device to the server host when the filter index of the data structure does not comply with the first set of filtering criteria, wherein content of the first set of filtering criteria residing in the first filtering data communications device is coordinated with a second set of filtering criteria residing in a second filtering data communications device that is capable of transferring the data structure to the server host such that at most one filtering data communications device transfers the data structure to the server host, wherein the step of transferring the data structure from the first filtering data communications device to the server host includes the step of:

transferring, from the first filtering data communications device to the server host, a first data structure provided by a first client host while preventing transfer, from the first filtering data communications device to the server host, of a second data structure provided by a second client host in order to allow the second filtering data communications device to load share transfer of data structures from multiple client hosts to the server host.

7. The method of claim 6 further comprising the steps of:
detecting, by the first filtering data communications device, a failure of the second filtering data communications device; and
transferring, by the first filtering data communications device, a third data structure from the second client host to the server host.

8. The method of claim 6 further comprising the steps of:
forming an agreement between the first and second filtering data communications devices that includes (i) the first filtering data communications device agreeing to transfer further data structures from the second client host to the server host and that (ii) the second filtering data communications device agreeing not to transfer further data structures from the second client host to the server host; and
receiving, in the first filtering data communications device, a new data structure from the second client host and transferring the new data structure from the first filtering data communications device to the server host for load redistribution.

9. A method for transferring data from a client host to a server host, the data residing in a data structure having (i) a device identifier that uniquely identifies the server host among multiple server hosts and (ii) a filter index that is different than the device identifier, the method comprising the steps of:
receiving the data structure in a first filtering data communications device;
transferring the data structure from the first filtering data communications device to the server host when the filter index of the data structure complies with a first set of filtering criteria residing in the first filtering data communications device;
preventing transfer of the data structure from the first filtering data communications device to the server host when the filter index of the data structure does not comply with the first set of filtering criteria, wherein content of the first set of filtering criteria residing in the first filtering data communications device is coordinated with a second set of filtering criteria residing in a second filtering data communications device that is capable of transferring the data structure to the server host such that at most one filtering data communications device transfers the data structure to the server host;
after the step of transferring the data structure from the first filtering data communications device to the server host, determining that the server host has failed;
receiving a new data structure in the first filtering data communications device, the new data structure having the same device identifier as that of the data structure transferred to the server host that failed; and
transferring the new data structure from the first filtering data communications device to one of the multiple server hosts that is different than the server host that failed.

10. A filtering data communications device for transferring data from a client host to a server host, the data residing in a data structure having (i) a device identifier that uniquely identifies the server host among multiple server hosts and (ii) a filter index that is different than the device identifier, the filtering data communications device comprising:
an input port to receive the data structure;
memory that stores a first set of filtering criteria and a filtering application; and
a control circuit coupled to the input port and the memory, wherein the control circuit, when under direction of the filtering application:
(i) receives the data structure on the input port;
(ii) transfers the data structure from the filtering data communications device to the server host when the filter index of the data structure complies with the first set of filtering criteria, and
(iii) prevents transfer of the data structure from the filtering data communications device to the server host when the filter index of the data structure does not comply with the first set of filtering criteria,
wherein content of the first set of filtering criteria is coordinated with a second set of filtering criteria residing in another filtering data communications device that is capable of transferring the data structure to the server host such that at most one filtering data communications device transfers the data structure to the server host.

11. The filtering data communications device of claim 10 wherein the server host includes multiple server computers each of which is identifiable by the device identifier, and wherein the control circuit, when under direction of the filtering application:
sends the data structure to one of the multiple server computers based on the filter index.

12. The filtering data communications device of claim 10 wherein the filter index of the data structure includes a source identifier that uniquely identifies the client host among multiple client hosts, wherein the first set of filtering criteria includes a filter table, and wherein the control circuit, when under direction of the filtering application:
generates a key based on the source identifier of the filter index; and
selects, from the filter table, a filter table entry based on the key in order to determine whether the filter index complies with the first set of filtering criteria, wherein the filtering index complies with the first set of filtering criteria when a device identifier of the selected filter table entry identifies the filtering data communications device, and wherein the filtering index does not comply with the first set of filtering criteria when the device identifier of the selected filter table entry does not identify the filtering data communications device.

13. The filtering data communications device of claim 12 further comprising:
multiple output ports, wherein the control circuit, when transferring the data structure to the server host:
(i) selects one of the multiple ports of the filtering data communications device based on the selected filter table entry; and
(ii) sends the data structure to the server host from the selected one of the multiple ports.

14. The filtering data communications device of claim 10 wherein the control circuit, when transferring the data structure from the filtering data communications device to the server host, is configured to:

select the server host among the multiple server hosts based on the filter index of the data structure, each of the multiple server hosts having an identical media access control address.

15. A filtering data communications device for transferring data from a client host to a server host, the data residing in a data structure having (i) a device identifier that uniquely identifies the server host among multiple server hosts and (ii) a filter index that is different than the device identifier, the filtering data communications device comprising:

an input port to receive the data structure;

memory that stores a first set of filtering criteria and a filtering application; and a control circuit coupled to the input port and the memory, wherein the control circuit, when under direction of the filtering application:
(i) receives the data structure on the input port;
(ii) transfers the data structure from the filtering data communications device to the server host when the filter index of the data structure complies with the first set of filtering criteria, and
(iii) prevents transfer of the data structure from the filtering data communications device to the server host when the filter index of the data structure does not comply with the first set of filtering criteria, wherein content of the first set of filtering criteria is coordinated with a second set of filtering criteria residing in another filtering data communications device that is capable of transferring the data structure to the server host such that at most one filtering data communications device transfers the data structure to the server host, and wherein the control circuit, when transferring the data structure to the server host:
transfers a first data structure provided by a first client host while preventing transfer, to the server host, of a second data structure provided by a second client host in order to allow the other filtering data communications device to load share transfer of data structures from multiple client hosts to the server host.

16. The filtering data communications device of claim 15 wherein the control circuit, when under the direction of the filtering application, is configured to:
(i) detect a failure of the other filtering data communications device; and
(ii) transfer a third data structure from the second client host to the server host.

17. The filtering data communications device of claim 15 wherein the control circuit, when under the direction of the filtering application, is configured to:
(i) form an agreement with the other filtering data communications device to transfer further data structures from the second client host to the server host with the other filtering data communications device not transferring further data structures from the second client host to the server host; and
(ii) receive a new data structure from the second client host and transferring the new data structure to the server host for load redistribution.

18. A filtering data communications device for transferring data from a client host to a server host, the data residing in a data structure having (i) a device identifier that uniquely identifies the server host among multiple server hosts and (ii) a filter index that is different than the device identifier, the filtering data communications device comprising:

an input port to receive the data structure;

memory that stores a first set of filtering criteria and a filtering application; and a control circuit coupled to the input port and the memory, wherein the control circuit, when under direction of the filtering application:
(i) receives the data structure on the input port;
(ii) transfers the data structure from the filtering data communications device to the server host when the filter index of the data structure complies with the first set of filtering criteria, and
(iii) prevents transfer of the data structure from the filtering data communications device to the server host when the filter index of the data structure does not comply with the first set of filtering criteria, wherein content of the first set of filtering criteria is coordinated with a second set of filtering criteria residing in another filtering data communications device that is capable of transferring the data structure to the server host such that at most one filtering data communications device transfers the data structure to the server host, and wherein the control circuit is configured to:
after transferring the data structure from the first filtering data communications device to the server host, determine whether the server host has failed and, following such a determination:
(i) receive a new data structure in the first filtering data communications device, the new data structure having the same device identifier as that of the data structure transferred to the server host that failed; and
(ii) transfer the new data structure from the first filtering data communications device to one of the multiple server hosts that is different than the server host that failed.

19. A computer program product that includes a computer readable medium having instructions stored thereon for transferring data from a client host to a server host, the data residing in a data structure having (i) a device identifier that uniquely identifies the server host among multiple server hosts and (ii) a filter index that is different than the device identifier, such that the instructions, when processed by a first filtering data communications device, cause the first filtering data communications device to perform the steps of:

receiving the data structure;

transferring the data structure from the first filtering data communications device to the server host when the filter index of the data structure complies with a first set of filtering criteria residing in the first filtering data communications device; and preventing transfer of the data structure from the first filtering data communications device to the server host when the filter index of the data structure does not comply with the first set of filtering criteria, wherein content of the first set of filtering criteria residing in the first filtering data communications device is coordinated with a second set of filtering criteria residing in a second filtering data communications device that is capable of transferring the data structure to the server host such that at most one filtering data communications device transfers the data structure to the server host.

20. The computer program product of claim 19 wherein the filter index of the data structure includes a source identifier that uniquely identifies the client host among multiple client hosts, wherein the first set of filtering criteria includes a filter table, and wherein the instructions, when processed by the first filtering data communications device, cause the first filtering data communications device to further perform the steps of:

generating a key based on the source identifier of the filter index; and selecting, from the filter table, a filter table entry based on the key in order to determine whether the filter index complies with the first set of filtering criteria, wherein the filter index complies with the first set of filtering criteria when a device identifier of the selected filter table entry identifies the first filtering data communications device, and wherein the filter index does not comply with the first set of filtering criteria when the device identifier of the selected filter table entry does not identify the first filtering data communications device.

21. The computer program product of claim 19 wherein the step of transferring the data structure from the first filtering data communications device to the server host includes the step of:

transferring, from the first filtering data communications device to the server host, a first data structure provided by a first client host while preventing transfer, from the first filtering data communications device to the server host, of a second data structure provided by a second client host in order to allow the second filtering data communications device to load share transfer of data structures from multiple client hosts to the server host.

22. A server system for exchanging data with multiple client hosts, wherein data from a first client host resides in a first data structure having a first device identifier that uniquely identifies a server host among multiple server hosts and a first filter index that is different than the first device identifier, and wherein data from a second client host resides in a second data structure having a second device identifier that uniquely identifies the server host among the multiple server hosts and a second filter index that is different than the second device identifier, the server system comprising:

multiple server computers that form a server host, the multiple server computers including a first server computer and a second server computer; and multiple filtering data communications devices, coupled to the multiple server computers, which transfer the data from the first and second client hosts to the multiple server computers, the multiple filtering data communications devices including:

a first filtering data communications device that receives the first data structure from the first client host and the second data structure from the second client host, and transfers the first data structure to the first server computer without transferring the second data structure to any of the multiple server computers according to a first set of filtering criteria; and a second filtering data communications device that receives the first data structure from the first client host and the second data structure from the second client host, and transfers the second data structure to the second server computer without transferring the first data structure to any of the multiple server computers according to a second set of filtering criteria, wherein content of the first set of filtering criteria is coordinated with the second set of filtering criteria and content of the second set of filtering criteria is coordinated with the first set of filtering criteria such that at most one filtering data communications device transfers each of the first and second data structures to the multiple server computers.

23. A server system for exchanging data with multiple client hosts, wherein data from a first client host resides in a first data structure having a first device identifier that uniquely identifies a server host among multiple server hosts and a first filter index that is different than the first device identifier, and wherein data from a second client host resides in a second data structure having a second device identifier that uniquely identifies the server host among the multiple server hosts and a second filter index that is different than the second device identifier, the server system comprising:

multiple server computers that form a server host, the multiple server computers including a first server computer and a second server computer; and multiple filtering data communications devices, coupled to the multiple server computers, which transfer the data from the first and second client hosts to the multiple server computers, the multiple filtering data communications devices including:

a first filtering data communications device that receives the first data structure from the first client host and the second data structure from the second client host, and transfers the first data structure to the first server computer without transferring the second data structure to any of the multiple server computers according to a first set of filtering criteria; and a second filtering data communications device that receives the first data structure from the first client host and the second data structure from the second client host, and transfers the second data structure to the second server computer without transferring the first data structure to any of the multiple server computers according to a second set of filtering criteria, wherein content of the first set of filtering criteria is coordinated with the second set of filtering criteria and content of the second set of filtering criteria is coordinated with the first set of filtering criteria such that at most one filtering data communications device transfers each of the first and second data structures to the multiple server computers, wherein the first and second device identifiers are identical, wherein the first filtering data communications device is coupled to the first server computer and not coupled to the second server computer, and wherein the second filtering data communications device is coupled to the second server computer and not coupled to the first server computer.

24. A server system for exchanging data with multiple client hosts, wherein data from a first client host resides in a first data structure having a first device identifier that uniquely identifies a server host among multiple server hosts and a first filter index that is different than the first device identifier, and wherein data from a second client host resides in a second data structure having a second device identifier that uniquely identifies the server host among the multiple server hosts and a second filter index that is different than the second device identifier, the server system comprising:

multiple server computers that form a server host, the multiple server computers including a first server computer and a second server computer; and multiple filtering data communications devices, coupled to the multiple server computers, which transfer the data from the first and second client hosts to the multiple server computers, the multiple filtering data communications devices including:

a first filtering data communications device that receives the first data structure from the first client host and the second data structure from the second client host, and transfers the first data structure to the first server computer without transferring the second data structure to any of the multiple server computers according to a first set of filtering criteria; and a second filtering data communications device that receives the first data structure from the first client host and the second data structure from the second client host, and transfers the second data structure to the second server computer without transferring the first data structure to any of the multiple server computers according to a second set of filtering criteria, wherein content of the first set of filtering criteria is coordinated with the second set of filtering criteria and content of the second set of filtering criteria is coordinated with the first set of filtering criteria such that at most one filtering data communications device transfers each of the first and second data structures to the multiple server computers, wherein the first and second device identifiers are identical, wherein the first filtering data communications device is coupled to both the first and second server computers, and wherein the second filtering data communications device is coupled to both the first and second server computers.

* * * * *